US010094255B2

United States Patent
Okazaki et al.

(10) Patent No.: US 10,094,255 B2
(45) Date of Patent: Oct. 9, 2018

(54) BLOW-BY HEATER

(71) Applicant: NIFCO INC., Yokosuka-shi, Kanagawa (JP)

(72) Inventors: Tsuyoshi Okazaki, Yokosuka (JP); Hiroyuki Nakaya, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 140 days.

(21) Appl. No.: 15/111,669

(22) PCT Filed: Jan. 19, 2015

(86) PCT No.: PCT/JP2015/051282
§ 371 (c)(1),
(2) Date: Jul. 14, 2016

(87) PCT Pub. No.: WO2015/108192
PCT Pub. Date: Jul. 23, 2015

(65) Prior Publication Data
US 2016/0341082 A1    Nov. 24, 2016

(30) Foreign Application Priority Data

Jan. 20, 2014 (JP) .................... 2014-008111

(51) Int. Cl.
*F02B 25/06* (2006.01)
*F01M 13/04* (2006.01)
(Continued)

(52) U.S. Cl.
CPC ....... *F01M 13/04* (2013.01); *B29C 45/14598* (2013.01); *B29C 65/70* (2013.01);
(Continued)

(58) Field of Classification Search
CPC .. F01M 13/04; B29C 45/14598; B29C 65/70; F24H 3/0342; B29L 2031/779; F02M 2013/0472
(Continued)

(56) References Cited

U.S. PATENT DOCUMENTS 3,971,416 A * 7/1976 Johnson ................ F16L 53/008
137/341
2006/0144376 A1* 7/2006 Gschwind ............. F01M 13/00
123/573

(Continued)

FOREIGN PATENT DOCUMENTS

DE     10325965 A1    12/2004
JP     2006-177460 A   7/2006
(Continued)

OTHER PUBLICATIONS

Europe Patent Office, "Search Report for European Patent Application No. 15736906.7," dated Aug. 16, 2017.
PCT International Search Report of PCT/JP2015/051282.

*Primary Examiner* — Marguerite McMahon
(74) *Attorney, Agent, or Firm* — Manabu Kanesaka

(57) ABSTRACT

A blow-by heater includes a metal pipe for flowing a blow-by gas therethrough. The metal pipe includes a flat portion on one side along an axis direction and a curved portion on a side opposite to the flat portion and is formed of a metal plate with a joining portion abutting against each other at edges of the metal plate at the curved portion. The blow-by gas heater further includes a resin molded over the metal pipe, and a heating source provided inside resin and directly contacting the flat portion.

4 Claims, 5 Drawing Sheets

(51) Int. Cl.
*B29C 45/14* (2006.01)
*B29C 65/70* (2006.01)
*F24H 3/04* (2006.01)
*B29L 31/00* (2006.01)

(52) U.S. Cl.
CPC ...... *F24H 3/0452* (2013.01); *B29L 2031/779* (2013.01); *F01M 2013/0472* (2013.01)

(58) Field of Classification Search
USPC ...................................... 123/572–574, 41.86
See application file for complete search history.

(56) References Cited

U.S. PATENT DOCUMENTS

| | | |
|---|---|---|
| 2006/0157501 A1 | 7/2006 | Jackson et al. |
| 2008/0099000 A1* | 5/2008 | Suzuki ............... F01M 13/0011 123/574 |
| 2009/0229584 A1* | 9/2009 | Asanuma ............... F02M 25/06 123/573 |

FOREIGN PATENT DOCUMENTS

| | | |
|---|---|---|
| JP | 2012-215137 A | 11/2012 |
| JP | 2013-124566 A | 6/2013 |
| JP | 2013-130102 A | 7/2013 |
| JP | 2014-173437 A | 9/2014 |

\* cited by examiner

BLOW-BY HEATER

FIELD OF TECHNOLOGY

The present invention relates to a blow-by heater heating a blow-by gas of an engine, and preventing moisture and the like contained in the blow-by gas from attaching or freezing to an inner wall portion of a pipe line.

BACKGROUND ART

In order to avoid environmental pollution, the blow-by gas of the engine is circulated to a gas-intake route of the engine without ejecting the blow-by gas of the engine to the atmosphere. Then, in such a blow-by-gas-circulation pipe line, in order to prevent the moisture and the like contained in the blow-by gas from attaching or freezing to the inner wall portion of the pipe line, conventionally, there is widely used a blow-by gas heater.

FIG. 6 is a schematic perspective view showing a conventional blow-by gas heater (corresponding to FIG. 11 of Patent Document 1), and FIG. 7 is a schematic cross-sectional view showing an example wherein the blow-by gas heater in FIG. 6 is provided in a blow-by-gas circulation passage (corresponding to FIG. 9 of the Patent Document 1).

As shown in FIG. 6 and FIG. 7, a metal pipe 55 which becomes a passage of the blow-by gas includes a smooth wall portion 55d and a partially cylindrical wall portion 55e (see FIG. 6). Therefore, a cross-sectional opening shape of the metal pipe 55 has a partially circular shape. A tip of the smooth wall portion 55d and a tip of the partially cylindrical wall portion 55e form a common opening end face of the metal pipe 55, and a whole tip of the smooth wall portion 55d becomes a last portion 55c of an opening face of the metal pipe 55, and a center portion of the tip of the partially cylindrical wall portion 55e becomes a forefront portion 55b of the opening face of the metal pipe 55 (see FIG. 6 and FIG. 7). The smooth wall portion 55d is disposed in such a way as to face a heating source 56 which is an electronic ceramic heater through a heating-source attachment pipe 54 made of resin. In the heating source 56, there is supplied electric power through a plug member 57. Also, the metal pipe 55 includes a throttled portion 55f formed such that a cross-sectional opening area thereof becomes smaller toward a tip side.

As shown in FIG. 7, a protruding portion 55a of the metal pipe 55 is disposed in such a way as to protrude to a gas-intake-passage axis-line side al more than to an inner wall face 61d in a connecting pipe 61. Moisture or oil of the blow-by gas attached to the metal pipe 55 flows to a tip side thereof (downward) through the protruding portion 55a so as to prompt the moisture or oil of the blow-by gas to become a water droplet or an oil droplet.

PRIOR ART DOCUMENT

Patent Document

Patent Document 1: Japanese Patent Application Publication No. 2012-215137

SUMMARY OF THE INVENTION

Problems to be Solved by the Invention

Generally, the metal pipe 55 is formed by processing a metal plate formed by press punching into a tube shape. Then, a joining portion of the metal pipe 55 is positioned on a smooth wall portion 55d side, and processed to be bent so that a large gap does not remain. A gap of the joining portion of the metal pipe 55 is not large; however, therethrough, a small amount of the blow-by gas leaks out. Consequently, in order to protect the heating source 56 from the blow-by gas, there is interposed the heating-source attachment pipe 54 made of resin between the smooth wall portion 55d and the heating source 56 as described above.

If the smooth wall portion 55d which is a metal material can directly contact the heating source 56 without interposing the heating-source attachment pipe 54, a heat transfer performance notably improves. Consequently, in order to protect the heating source 56 from the blow-by gas, it is necessary to provide the joining portion of the metal pipe 55 on a partially cylindrical wall portion 55e side, not on the smooth wall portion 55d side.

However, in a conventional technology, in a case wherein the joining portion of the metal pipe 55 is provided on the partially cylindrical wall portion 55e side, and not on the smooth wall portion 55d side, it is difficult to be processed to be bent so that the large gap does not remain.

The present invention is invented on the basis of the aforementioned knowledge. An object of the present invention is to provide a processing method such that in a case wherein a joining portion of a metal pipe is provided on a side different from a flat wall portion or a smooth wall portion, a large gap does not remain, and thereby, providing a blow-by heater wherein the joining portion of the metal pipe is positioned on the side different from the flat wall portion or the smooth wall portion.

Specifically, the present inventors have developed a method of molding a resin molded article wherein the metal plate is inserted in a state of being processed to be bent into the tube shape, and in a case wherein the metal plate processed to be bent into the tube shape forms the metal pipe including the flat wall portion or the smooth wall portion, and a curved wall portion, a die abuts against abutting portions on an outer peripheral face of the curved wall portion on both sides sandwiching the joining portion of the metal pipe so as to position the joining portion of the metal pipe in the curved wall portion, and while maintaining a state wherein the joining portion of the metal pipe is firmly attached, resin molding is performed.

Means for Solving the Problems

The present invention is a blow-by heater produced by the aforementioned method developed by the present inventors.

Namely, the blow-by heater comprises a tube member allowing a blow-by gas to flow through, and opening in a downstream side, and the tube member is formed as a resin molded article wherein a metal plate is inserted in a state of being processed to be bent into a tube shape. Also, the metal plate processed to be bent into the tube shape forms a metal pipe including a flat wall portion or a smooth wall portion, and a curved wall portion, and in the curved wall portion, there is positioned a joining portion of the metal pipe, and in the flat wall portion or the smooth wall portion, there is provided a heating source.

According to the present invention, the joining portion of the metal pipe is positioned in the curved wall portion of the metal pipe, so that there is no need to interpose, i.e. an intermediate member for protecting the heating source from the blow-by gas, and the heating source can be directly provided in the flat wall portion or the smooth wall portion. Thereby, a heat transfer performance notably improves.

Also, since there is no need for the intermediate member, an effect of reducing the number of parts can be obtained as well.

In a case wherein the heating source is directly provided in the flat wall portion or the smooth wall portion, it is preferable that there is provided a convex portion or a concave portion for positioning the heating source in the flat wall portion or the smooth wall portion. In that case, the positioning of the heating source can be easily and reliably carried out.

Generally, the curved wall portion includes a portion (a throttled portion) wherein a cross-sectional area decreases toward the downstream side. For example, the joining portion of the metal pipe corresponds to a ridge line of a top portion of the curved wall portion facing the flat wall portion or the smooth wall portion, and there is formed a slope portion extending in a direction perpendicular to an axis direction of the metal pipe on both sides of the ridge line. Then, corresponding to the aforementioned method developed by the present inventors, on an outer peripheral face of the curved wall portion on both sides sandwiching the joining portion of the metal pipe, for example, an outer peripheral face of the slope portion on both sides sandwiching the joining portion of the metal pipe, there is provided an abutting portion wherein at a time of insert molding, a die abuts, and after the insert molding, the abutting portion is exposed without being coated with resin.

The present invention is not limited to the blow-by heater at least at the time of the present application.

Namely, the present invention is the resin molded article wherein the metal plate is inserted in the state of being processed to be bent into the tube shape, and the metal plate processed to be bent into the tube shape forms the metal pipe including the flat wall portion or the smooth wall portion, and the curved wall portion, and the joining portion of the metal pipe is positioned in the curved wall portion. Also, on the outer peripheral face of the curved wall portion on both sides sandwiching the joining portion of the metal pipe, there is provided the abutting portion wherein at the time of insert molding, the die abuts, and after the insert molding, the abutting portion is exposed without being coated with the resin.

Alternatively, the present invention is the resin molded article wherein the metal plate is inserted in the state of being processed to be bent into the tube shape, and the metal plate processed to be bent into the tube shape forms the metal pipe including the slope portion extending in the direction perpendicular to the axis direction at least in one portion, and in the slope portion, there is positioned the joining portion of the metal pipe. Also, on the outer peripheral face of the slope portion on both sides sandwiching the joining portion of the metal pipe, there is provided the abutting portion wherein at the time of insert molding, the die abuts, and after the insert molding, the abutting portion is exposed without being coated with the resin.

Also, the present invention includes the aforementioned method itself developed by the present inventors as well at least at the time of the present application.

Namely, the present invention is a method of forming the resin molded article, which is a method of molding the resin molded article wherein the metal plate is inserted in the state of being processed to be bent into the tube shape, and the metal plate processed to be bent into the tube shape forms the metal pipe including the flat wall portion or the smooth wall portion, and the curved wall portion. Also, in the curved wall portion, there is positioned the joining portion of the metal pipe, and the die abuts against the abutting portion on the outer peripheral face of the curved wall portion on both sides sandwiching the joining portion of the metal pipe, and in a state wherein the joining portion of the metal pipe is firmly attached, resin molding is performed.

Alternatively, the present invention is the method of forming the resin molded article, which is the method of molding the resin molded article wherein the metal plate is inserted in the state of being processed to be bent into the tube shape, and the metal plate processed to be bent into the tube shape forms the metal pipe including the slope portion extending in the direction perpendicular to the axis direction at least in one portion. Also, in the slope portion, there is positioned the joining portion of the metal pipe, and the die abuts against the abutting portion on the outer peripheral face of the slope portion on both sides sandwiching the joining portion of the metal pipe, and in the state wherein the joining portion of the metal pipe is firmly attached, the resin molding is performed.

Effect of the Invention

According to the present invention, the joining portion of the metal pipe is positioned in the curved wall portion of the metal pipe, so that there is no need to interpose, i.e. the intermediate member for protecting the heating source from the blow-by gas, and the heating source can be directly provided in the flat wall portion or the smooth wall portion. Thereby, the heat transfer performance notably improves. Also, since there is no need for the intermediate member, the effect of reducing the number of parts can be obtained as well.

BEST MODES OF CARRYING OUT THE INVENTION

Hereinafter, with reference to the attached drawings, an embodiment of the present invention will be explained in detail.

Figure 1:
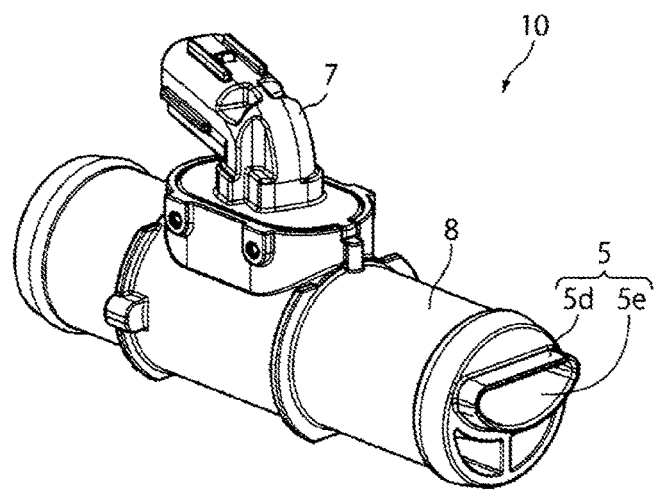
FIG. 1 is a schematic perspective view showing a blow-by gas heater of one embodiment of the present invention.
Figure 2:
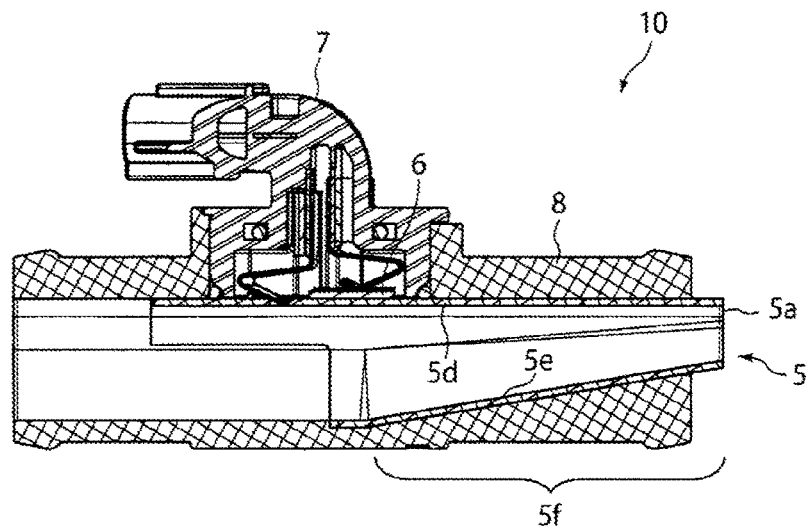
FIG. 2 is a schematic cross-sectional view of the blow-by gas heater in FIG. 1.

FIG. 1 is a schematic perspective view showing a blow-by gas heater of one embodiment of the present invention; FIG. 2 is a schematic cross-sectional view of the blow-by gas heater in FIG. 1; and FIG. 3 is a schematic front view of the blow-by gas heater in FIG. 1.

Figure 3:
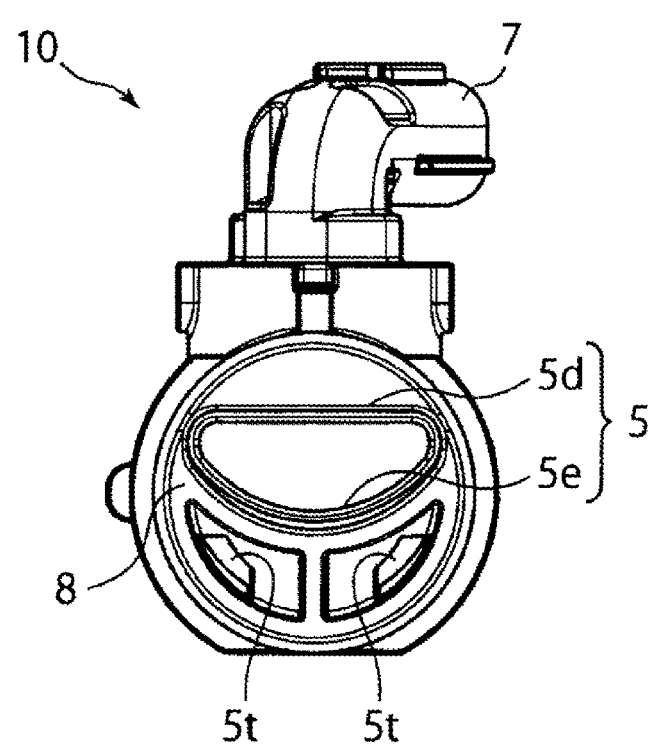
FIG. 3 is a schematic front view of the blow-by gas heater in FIG. 1.

As shown in FIG. 1 to FIG. 3, in a blow-by gas heater 10 of one embodiment of the present invention, a metal pipe 5 which becomes a passage of a blow-by gas includes a flat wall portion or smooth wall portion 5d, and a curved wall portion 5e (see FIG. 1). A cross-sectional opening shape of the metal pipe 5 has an approximately half-moon shape. A whole tip of the flat wall portion or smooth wall portion 5d, and a tip of the curved wall portion 5e form a common opening end face 5a of the metal pipe 5 (see FIG. 2). The flat wall portion or smooth wall portion 5d is disposed in such a way as to directly face a heating source 6 which is, for example, a commercially available electronic ceramic heater. In the heating source 6, there is supplied electric power through a plug member 7. Also, the metal pipe 5 includes a throttled portion 5f formed such that a cross-sectional opening area thereof becomes smaller toward a tip side.

Figure 4A:
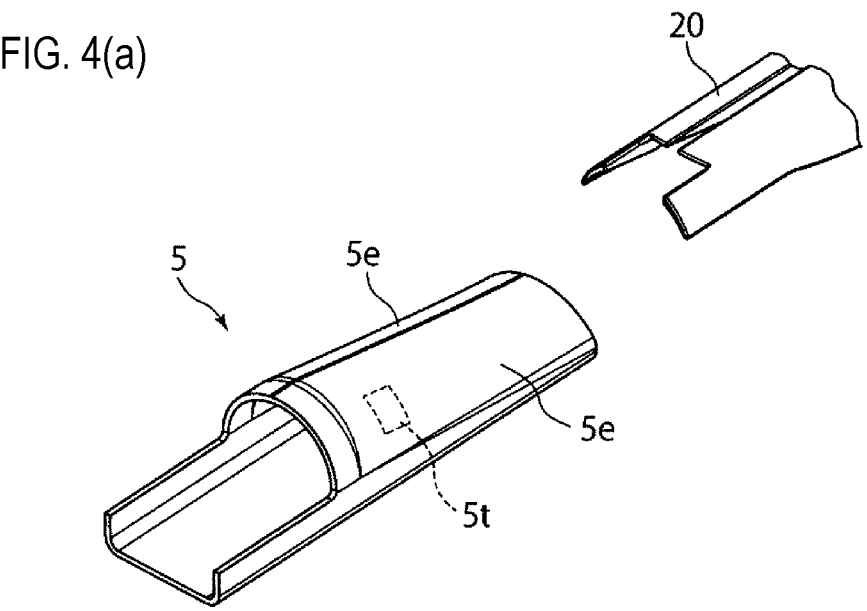
FIGS. 4(a) and 4(b) are schematic views for explaining a die when the blow-by gas heater in FIG. 1 is molded.
Figure 4B:
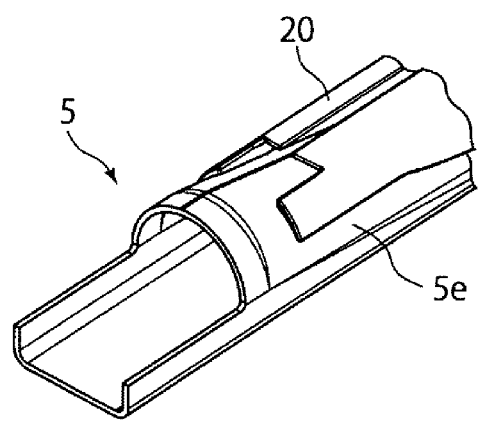

The metal pipe 5 as described above is insert-molded into an outer tube 8 made of resin. Specifically, as shown in FIGS. 4(a) and 4(b), a load is applied to abutting portions 5t on an outer peripheral face of the curved wall portion 5e on both sides sandwiching a joining portion of the metal pipe 5 by a die 20 (from a state shown in FIG. 4(a) to a state shown in FIG. 4(b)), and in a state wherein the joining portion of the metal pipe 5 is firmly attached, resin molding is performed around the metal pipe 5 such that even in a case wherein the joining portion of the metal pipe 5 is provided in the curved wall portion 5e, a large gap does not remain. After such insert molding, the die 20 retracts in an axis direction of the metal pipe 5 to be separated from the abutting portions 5t (from the state shown in FIG. 4(b) to the state shown in FIG. 4(a)). Therefore, after the insert molding, the abutting portions 5t become exposed portions without being coated with resin.

As shown in FIG. 1 to FIG. 3, in the present embodiment, the joining portion of the metal pipe 5 corresponds to a ridge line of a top portion of the curved wall portion 5e facing the flat wall portion or smooth wall portion 5d, and there are formed slope portions (which are curved surfaces) extending in a direction perpendicular to the axis direction of the metal pipe 5 on both sides of the ridge line, and there are provided the abutting portions 5t on outer peripheral faces of the slope portions.

Figure 5:
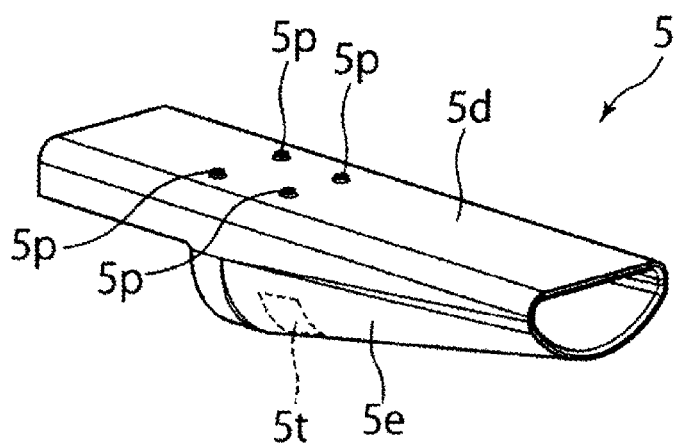
FIG. 5 is a schematic perspective view showing an upper face of a metal pipe of the blow-by gas heater in FIG. 1.
Figure 6:
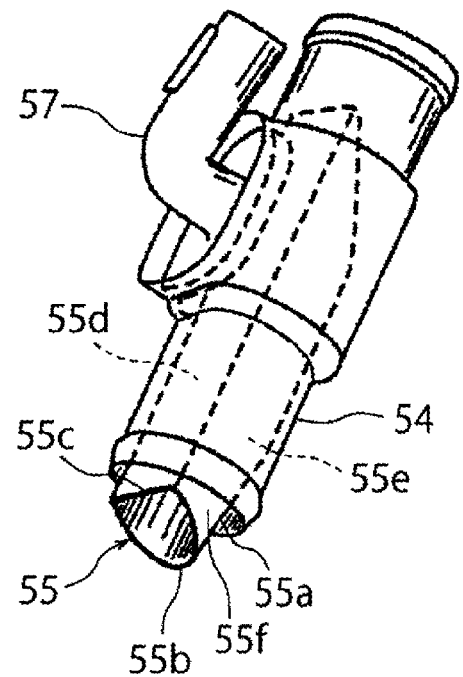
FIG. 6 is a schematic perspective view showing a conventional blow-by gas heater.
Figure 7:
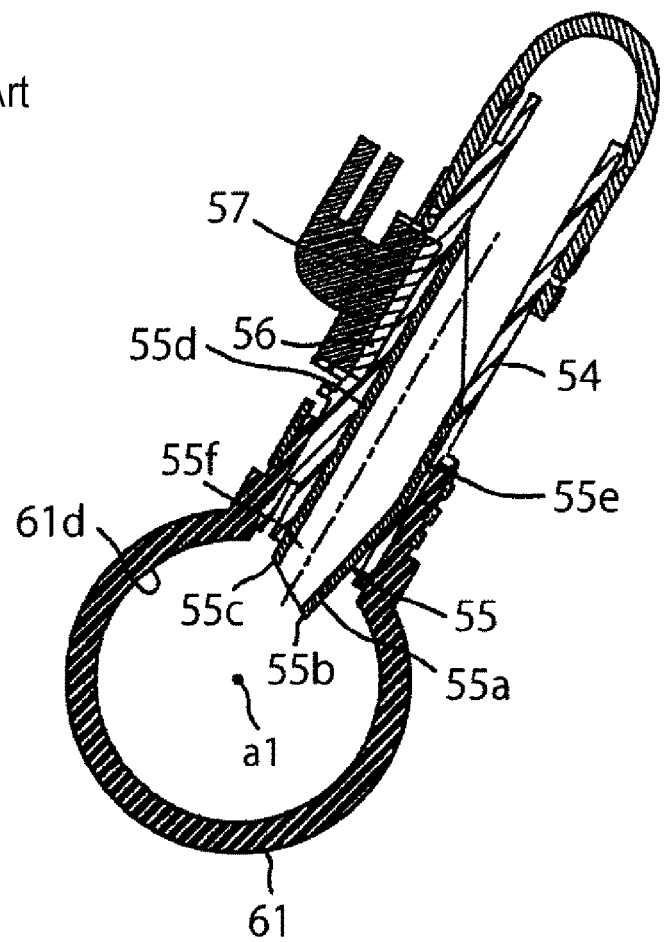
FIG. 7 is a schematic cross-sectional view showing an example wherein the blow-by gas heater in FIG. 6 is provided in a blow-by-gas circulation passage.

Also, as shown in FIG. 5, in order to easily and reliably carry out the positioning of the heating source 6, there are provided convex portions 5p (may be concave portions) for positioning the heating source 6 in the flat wall portion or smooth wall portion 5d.

Next, an operation of the blow-by gas heater 10 of the present embodiment as described above will be explained. The opening end face 5a of the metal pipe 5 is disposed in such a way as to protrude into a gas-intake passage pipe (not shown in the drawings). The blow-by gas is guided inside the metal pipe 5 to flow. In that process, moisture or oil of the blow-by gas, which happens to be condensed, is dissolved by a heat from the heating source 6.

Nevertheless, a small amount of the moisture or oil of the blow-by gas happened to be attached to the metal pipe 5 is guided up to the opening end face 5a so as to become a water droplet or an oil droplet in the opening end face 5a, and scatter into an air flow flowing inside the gas-intake passage pipe (not shown in the drawings). Here, since a size of a scattered water droplet or oil droplet is sufficiently small, even in a case wherein the scattered water droplet or oil droplet freezes and the like thereafter, an ice block thereof has a small volume so as to suppress damages and the like of, for example, a turbo impeller.

According to the blow-by gas heater 10 of the present embodiment as described above, the joining portion of the metal pipe 5 is positioned in the curved wall portion 5e of the metal pipe 5, so that there is no need to interpose, i.e. an intermediate member for protecting the heating source 6 from the blow-by gas, and the heating source 6 can be directly provided in the flat wall portion or smooth wall portion 5d. Thereby, a heat transfer performance notably improves. Also, since there is no need for the intermediate member, an effect of reducing the number of parts can be obtained as well.

Also, according to the blow-by gas heater 10 of the present embodiment, the convex portions 5p for positioning the heating source are provided in the flat wall portion or smooth wall portion 5d so as to easily and reliably carry out the positioning of the heating source 6.

Incidentally, all contents of the specification, claims, drawings, and abstract of Japanese Patent Application No. 2014-008111 filed on Jan. 20, 2014 are cited in their entireties herein and are incorporated as a disclosure of the specification of the present invention.

What is claimed is:

1. A blow-by heater, comprising:
   a metal pipe for flowing a blow-by gas therethrough in a flow direction, the metal pipe including
      a flat portion on one side along an axis direction of the metal pipe, and
      a curved portion on a side opposite to the flat portion and including
         two curved members extending from two edges of the flat portion opposite to each other, each curved member including an inclined portion inclined toward a downstream side in respect to the flat portion so that a cross-sectional area of the metal pipe decreases toward the downstream side,
         a joining portion in which the two curved members abut against each other, and
         abutting portions on outer peripheral faces of the two curved members, respectively, and sandwiching the joining portion;
   a resin covering the metal pipe; and
   a heating source provided inside the resin and directly contacting the flat portion,
   wherein the abutting portions are not covered with the resin and are spaced apart from each other in a direction perpendicular to the axis direction.

2. A blow-by heater according to claim 1, wherein the flat portion includes a convex portion or a concave portion for positioning the heating source.

3. A blow-by heater according to claim 1, wherein each of the curved members further includes an arc-shaped end portion at an upstream end of each inclined portion so that an upstream end portion of the curved portion has a semi-circular shape,
   the flat portion has a length greater than that of the curved portion in the axial direction,
   a downstream end of the metal pipe is defined by downstream ends of the flat portion and the curved portion and an upstream end of the metal pipe is defined by an upstream end of the flat portion being arranged beyond the upstream end portion of the curved portion, and
   the two edges of the flat portion between the upstream end of the metal pipe and the upstream end portion of the curved portion extend along the axis direction in parallel to each other.

4. A blow-by heater according to claim 3, wherein the two curved members are arranged symmetrical relative to the flat portion so that the joining portion extends along the axis direction between the two curved members.

* * * * *